United States Patent
Uppu et al.

(10) Patent No.: US 11,258,400 B2
(45) Date of Patent: Feb. 22, 2022

(54) HEIGHT ADJUSTABLE SOLAR PANEL MOUNTING SYSTEM

(71) Applicant: Unirac Inc., Albuquerque, NM (US)

(72) Inventors: Sai Uppu, Albuquerque, NM (US); Todd Ganshaw, Albuquerque, NM (US)

(73) Assignee: Unirac Inc., Albuquerque, NM (US)

( * ) Notice: Subject to any disclaimer, the term of this patent is extended or adjusted under 35 U.S.C. 154(b) by 50 days.

(21) Appl. No.: 16/832,932

(22) Filed: Mar. 27, 2020

(65) Prior Publication Data

US 2020/0336100 A1 Oct. 22, 2020

Related U.S. Application Data

(60) Provisional application No. 62/834,874, filed on Apr. 16, 2019.

(51) Int. Cl.
*H02S 20/30* (2014.01)
*H02S 30/10* (2014.01)

(52) U.S. Cl.
CPC .............. *H02S 20/30* (2014.12); *H02S 30/10* (2014.12)

(58) Field of Classification Search
CPC ................................. H02S 20/30; H02S 30/10
See application file for complete search history.

(56) References Cited

U.S. PATENT DOCUMENTS

| | | | |
|---|---|---|---|
| 7,866,099 B2 | 1/2011 | Komamine et al. | |
| 8,938,932 B1 | 1/2015 | Wentworth et al. | |
| 9,825,581 B2 | 11/2017 | Wildes | |
| 2012/0073220 A1 | 3/2012 | Kobayashi et al. | |
| 2015/0052712 A1* | 2/2015 | Markiewicz | H02S 20/00 24/569 |
| 2017/0302221 A1* | 10/2017 | Jasmin | F24S 25/65 |

* cited by examiner

*Primary Examiner* — Jayne L Mershon
(74) *Attorney, Agent, or Firm* — Lee & Hayes, P.C.

(57) ABSTRACT

A solar panel mounting system including a rail and a clip. When a first notch of the rail receives a portion of a rib of the rail, the clip is positioned on the rail to receive an end of a first solar panel having a first thickness, and when a second notch of the rail receives the portion of the rib, the clip is positioned on the rail to receive an end of a second solar panel having a second thickness different than the first thickness of the first solar panel.

20 Claims, 8 Drawing Sheets

HEIGHT ADJUSTABLE SOLAR PANEL MOUNTING SYSTEM

RELATED APPLICATION

This application claims the benefit of U.S. Provisional Application No. 62/834,874, filed Apr. 16, 2019, and entitled "Height Adjustable Solar Panel Mounting System," which is incorporated herein by reference.

BACKGROUND

The industry for racks to mount solar panels (e.g., modules) on roofs is very competitive. However, because manufactures of the solar panels have not standardized, the sizes of the solar panels vary depending the manufacture. For example, the thickness (e.g., height) of a solar panel may vary depending on the manufacturer. As such, the racks for mounting the solar panels are relatively customized according to the size of the solar panel produced by the particular manufacturer. Accordingly, there remains a need for solar panel racks that are more adjustable.

SUMMARY

Solar panel mounting systems that have the ability to adjust for variations in the thickness (e.g., height) of the variety of solar panels are described herein. More specifically, this disclosure relates to solar panel mounting systems that include a clip (e.g., a module clip) that attaches to a rail (e.g., a trim rail) according to a solar panel (e.g., module) thickness (e.g., height). This summary is provided to introduce simplified concepts of solar panel mounting systems, which are further described below in the Detailed Description. This summary is not intended to identify essential features of the claimed subject matter, nor is it intended for use in determining the scope of the claimed subject matter.

In an embodiment, a solar panel mounting system includes a rail and a clip. The rail may include a horizontal flange protruding from an upper surface of the rail along a longitudinal length of the rail. The rail may include a rib protruding from a lower surface disposed a distance below the horizontal flange. The rib may extend along the longitudinal length. The clip may include a first notch and a second notch disposed in a back of the clip. When the first notch of the clip receives a portion of the rib, a first ledge of the clip may be positioned a first distance from the horizontal flange such that the first distance is sized to receive an end of a first solar panel having a first thickness. The end of the first solar panel having the first thickness may be received between the horizontal flange and the first ledge. When the second notch of the clip receives the portion of the rib, a second ledge of the clip is positioned a second distance, different than the first distance, from the horizontal flange such that the second distance is sized to receive an end of a second solar panel having a second thickness different than the first thickness of the first solar panel. The end of the second solar panel having the second thickness may be received between the horizontal flange and the second ledge. A fastener may fasten the clip to the rail via an opening arranged between the first ledge of the clip and the second ledge of the clip.

In an embodiment, a solar panel mounting system includes a clip having a first end separated a distance from a second end and a front opposite a back. The clip may include a first notch disposed in the back of the clip proximate to the first end of the clip for receiving a portion of a rib of a rail. The clip may include a second notch disposed in the back of the clip proximate to the second end of the clip for receiving a portion of the rib of the rail. The clip may include a first ledge protruding from the front of the clip opposite the first notch. The first ledge may interface with at least a portion of an end of a solar panel. The clip may include a second ledge protruding from the front of the clip opposite the second notch. The second ledge may interface with at least a portion of an end of a solar panel. When the first notch of the clip receives a portion of a rib of a rail, the first ledge is positioned a first distance from a horizontal flange of the rail such that the first distance is sized to receive an end of a first solar panel having a first thickness. When the second notch of the clip receives the portion of the rib of the rail, the second ledge is positioned a second distance, different than the first distance, from the horizontal flange of the rail such that the second distance is sized to receive an end of a second solar panel having a second thickness different than the first thickness of the first solar panel. The clip may include an opening arranged between the first ledge and the second ledge for receiving at least a portion of a fastener to fasten the clip to a rail.

In an embodiment, a solar panel mounting system includes a rail. The rail may attach to a bracket attached to a roof. The rail may include a horizontal flange protruding from an upper surface of the rail along a longitudinal length of the rail. The horizontal flange may interface with at least a portion of an end of a solar panel. The rail may include a rib protruding from a lower surface disposed a distance below the horizontal flange. The rib may extend along the longitudinal length. The rib may interface with a notch disposed in a back of a clip. The rail may include a channel extending along the longitudinal length adjacent to the rib. The channel may receive at least a portion of a fastener to fasten a clip to the rail.

Depending on the desired esthetic and mechanical properties of the solar panel mounting system, and a structure (e.g., a house, a building, a tower, a container, etc.) the solar panel mounting system is intended to mount thereto, components may comprise metal, plastic, and/or ceramic.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to solar panel mounting systems including a clip (e.g., a module clip) that attaches to a rail (e.g., a trim rail) to accommodate a thickness (e.g., height) of a solar panel (e.g., module). Because the clip of the solar panel mounting system is configured to accommodate a thickness of a solar panel, a user may quickly and easily install solar panels having varying thicknesses on a roof as desired. Moreover, because the solar panel mounting system includes the clip that attaches to the rail to quickly and easily accommodate a thickness of a solar panel, a higher modularity of solar panel mounting system is achieved as compared to solar panel mounting systems built for a specific solar panel having a specific thickness.

In an embodiment, a solar panel mounting system includes a rail that has a longitudinal length and is attachable to a bracket, which may be attached to a roof. The rail may include a rib disposed a distance below a horizontal flange that attaches to a notch of a clip according to a thickness of a solar panel. Because a rail may include a rib disposed a distance below a horizontal flange that attaches to a notch of a clip according to a thickness of a solar panel, the solar panel mountings may be more modular relative to systems utilizing rails built for a specific solar panel having a specific thickness.

Illustrative Solar Panel Mounting Systems

Figure 1:
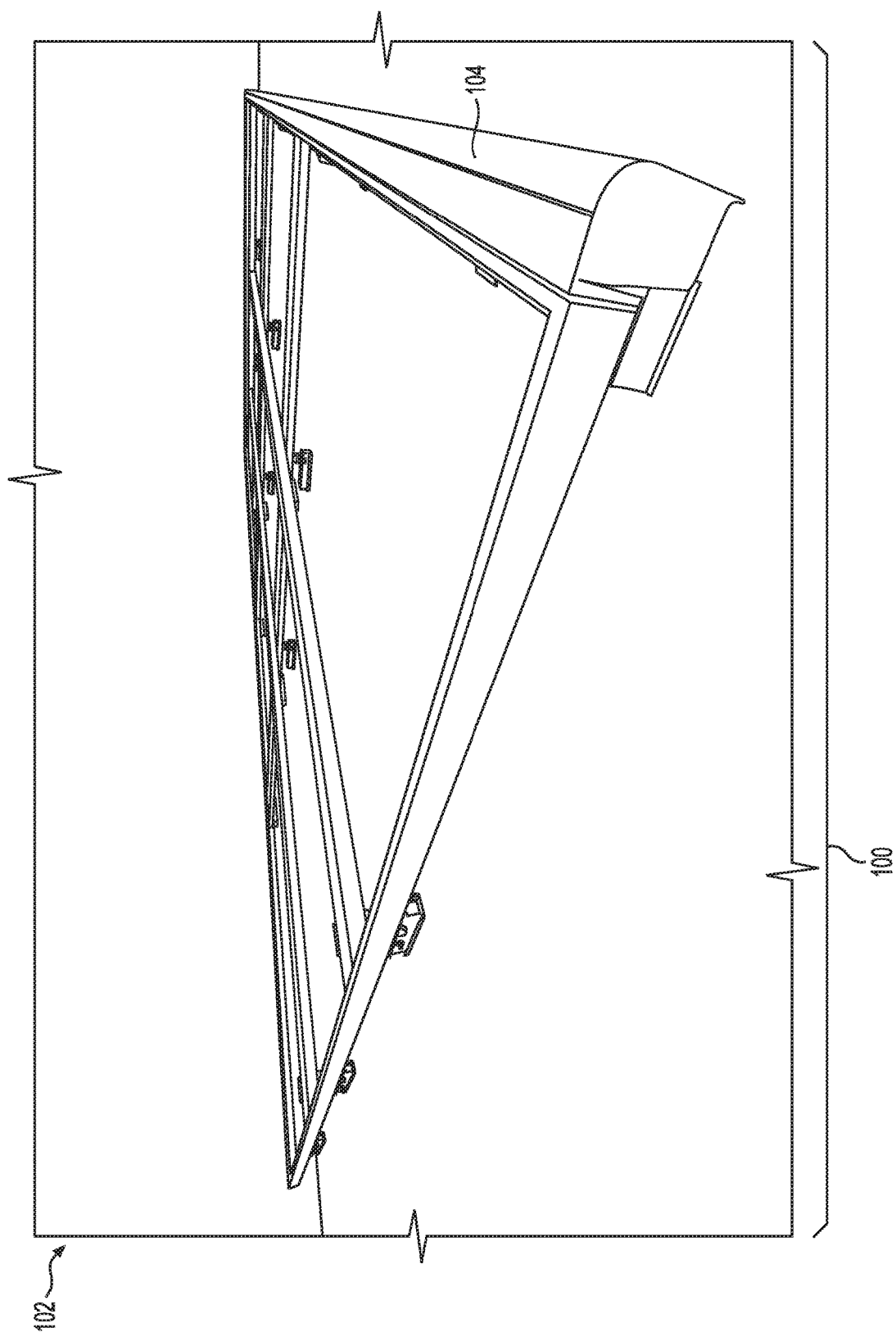
FIG. 1 illustrates a top perspective view of an exemplary solar panel mounting system including a rail for attaching to a bracket attached to a roof.

FIG. 1 illustrates a top perspective view 100 of an embodiment solar panel mounting system 102 including a rail 104. The system may be attached to a bracket (not shown) attached to a roof (not shown). The rail 104 may be an extrusion. For example, the rail 104 may be a metal extrusion, a plastic extrusion, a composite extrusion, etc.

The solar panel mounting system 102 may mount solar panels (e.g., modules) (not shown) to a roof. The sizes of the solar panels may vary. That is, the various distinct manufacturers of solar panels have not standardized the sizes of the solar panels available in the industry, and thus the size of each panel may vary based on the manufacturer producing the panel. For example, one manufacture may produce a solar panel having a thickness (e.g., height) of about 32 millimeters (mm), while another manufacture may produce another different solar panel having a thickness of about 40 mm. As such, the solar panel mounting system 102 may include a clip that attaches to the rail 104 according to a thickness of a solar panel. For example, the clip may attach to the rail 104 in a first orientation to accommodate a solar panel having a thickness of about 32 mm. In another example, the clip may attach to the rail 104 in a second orientation to accommodate another different solar panel having a thickness of about 40 mm. The solar panels may have different thickness depending on a solar cell efficiency of the solar panels. For example, a solar panel having a thickness of about 32 mm may have a lower solar cell efficiency than a solar panel having a thickness of about 40 mm. Therefore, a solar panel mounting system as described herein facilitates a user (e.g., an installer, a technician, etc.) to quickly and easily install solar panels having varying thicknesses on a roof as desired.

Figure 2:
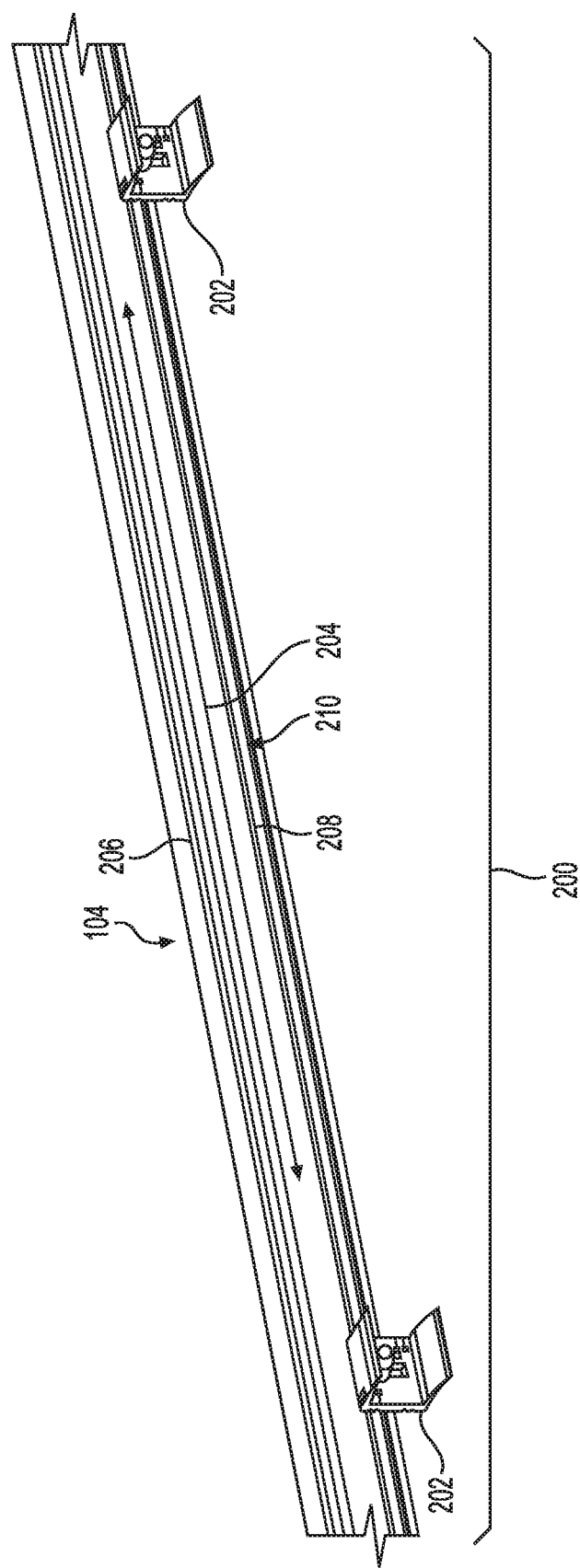
FIG. 2 illustrates a front perspective view of a clip attached to a rail of the solar panel mounting system of FIG. 1 according to an embodiment in this disclosure.

FIG. 2 illustrates a front perspective view 200 of a clip 202 attached to the rail 104 of the solar panel mounting system 102 of FIG. 1, according to an embodiment in this disclosure. FIG. 2 illustrates the rail 104 may having a longitudinal length 204. A horizontal flange 206 may protrude from an upper surface of the rail 104 along the longitudinal length 204. A rib 208 may protrude from a lower surface disposed a distance below the horizontal flange 206 and may extend along the longitudinal length 204. A channel 210 may extend along the longitudinal length 204 adjacent to the rib 208.

Figure 3:
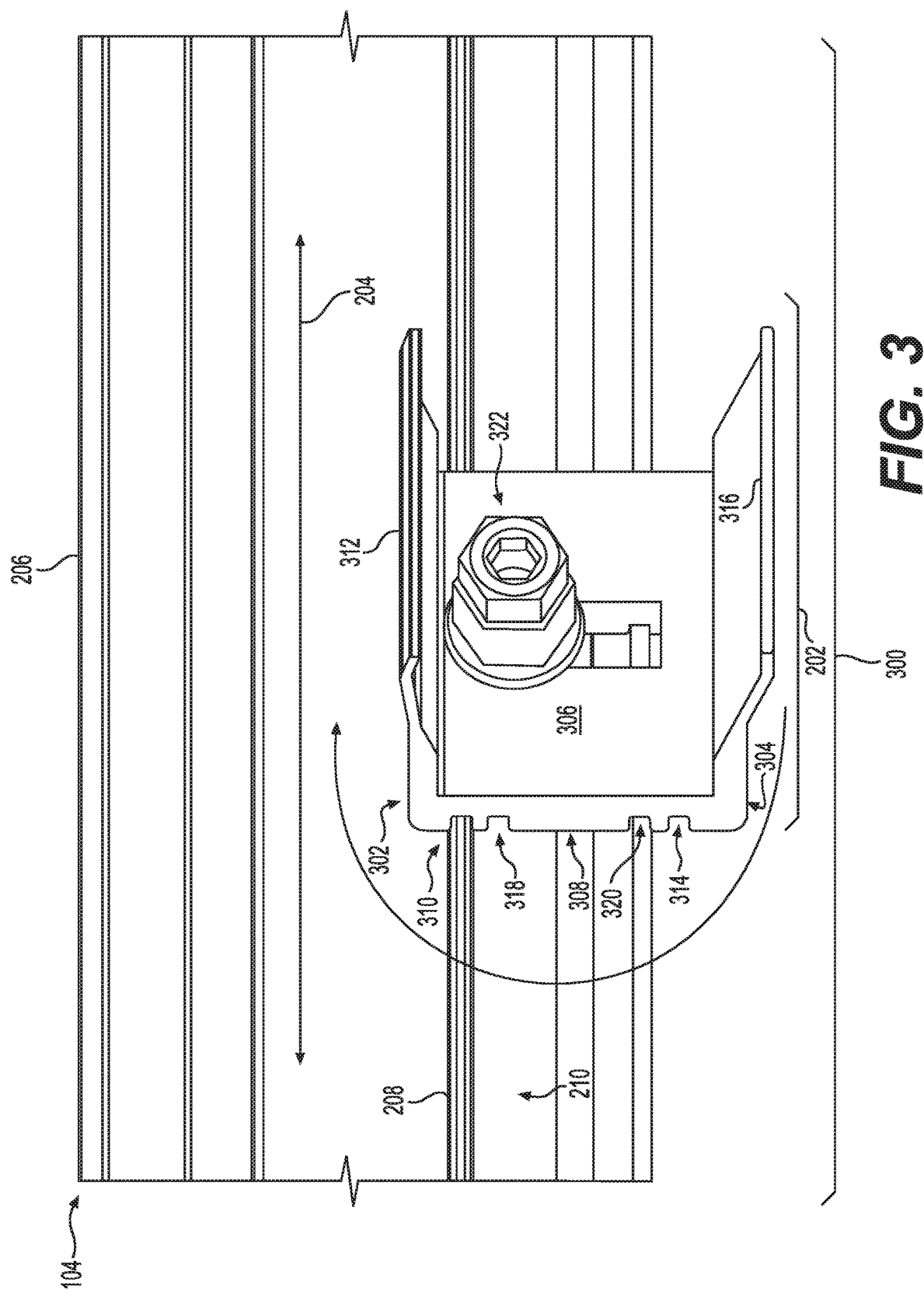
FIG. 3 illustrates a front perspective view of a clip attached to a rail of the solar panel mounting system of FIG. 1 according to an embodiment in this disclosure.

FIG. 3 illustrates a front perspective view 300 of the clip 202 attached to the rail 104 of the solar panel mounting system 102 of FIG. 1 according to an embodiment in this disclosure. The clip 202 may have a first end 302 separated a distance from a second end 304 and a front 306 opposite a back 308. The clip 202 may include a first notch 310 disposed in the back 308 of the clip 202 proximate to the first end 302 of the clip 202 for receiving a portion of the rib 208. When the clip 202 is in a first orientation (upright position, having the first end 302 of the clip 202 positioned proximate to the horizontal flange 206) the first notch 310 may receive a portion of the rib 208. When the first notch 310 receives the portion of the rib 208, a first ledge 312 of the clip 202 may be positioned a first distance from the horizontal flange 206 such that the first distance is sized to receive an end of a first solar panel having a first thickness (e.g., about 40 mm).

The clip 202 may include a second notch 314 disposed in the back 308 of the clip 202 proximate to the second end 304 of the clip 202 for receiving the portion of the rib 208. When the clip 202 is in a second orientation (flipped upside down 180 degrees from the first orientation such that the second end 304 of the clip 202 is positioned proximate to the horizontal flange 206) the second notch 314 may receive a portion of the rib 208. When the second notch 314 receives the portion of the rib 208, a second ledge 316 of the clip 202 may be positioned a second distance, different than the first distance, from the horizontal flange 206 such that the second distance is sized to receive an end of a second solar panel having a second thickness (e.g., about 38 mm) different than the first thickness of the first solar panel.

The clip 202 may include a third notch 318 disposed in the back 308 of the clip 202 proximate to the first end 302 of the clip 202 for receiving a portion of the rib 208. When the clip 202 is in the first orientation the third notch 318 may receive a portion of the rib 208. When the third notch 318 receives the portion of the rib 208, the first ledge 312 of the clip 202 may be positioned a third distance from the horizontal flange 206 such that the third distance is sized to receive an end of a third solar panel having a third thickness (e.g., about 35 mm).

The clip 202 may include a fourth notch 320 disposed in the back 308 of the clip 202 proximate to the second end 304 of the clip 202 for receiving a portion of the rib 208. When the clip 202 is in the second orientation the fourth notch 320 may receive a portion of the rib 208. When the fourth notch 320 receives the portion of the rib 208, the second ledge 316 of the clip 202 may be positioned a fourth distance from the horizontal flange 206 such that the fourth distance is sized to receive an end of a fourth solar panel having a fourth thickness. For example, when the fourth notch 320 receives the portion of the rib 208, the second ledge 316 of the clip 202 may be positioned a fourth distance from the horizontal flange 206 such that the fourth distance is sized to receive an end of a fourth solar panel having a fourth thickness of about 32 mm. In another example, when the fourth notch 320 receives the portion of the rib 208, the second ledge 316 of the clip 202 may be positioned a fourth distance from the horizontal flange 206 such that the fourth distance is sized to receive an end of a fourth solar panel having a fourth thickness of about 33 mm.

A fastener 322 may fasten the clip 202 to the rail 104. For example, the fastener 322 pass through an opening disposed in the clip 202 and engage with the channel 210. For example, the fastener 322 may be a T-bolt that passes through an opening disposed in the clip and engages with the channel 210 to fasten the clip 202 to the rail 104.

The first ledge 312 and/or the second ledge 316 may be a spring ledge for elastically supporting a solar panel. For example, the first ledge 312 and/or the second ledge 316 may be a spring ledge for providing an elastic, spring-like action, which generates a reaction (supporting) force that reacts elastically in a vertical direction, pushing up against the underside of a solar panel when the solar panel is inserted and rotated down against the first ledge 312 or the second ledge 316.

Figure 4:
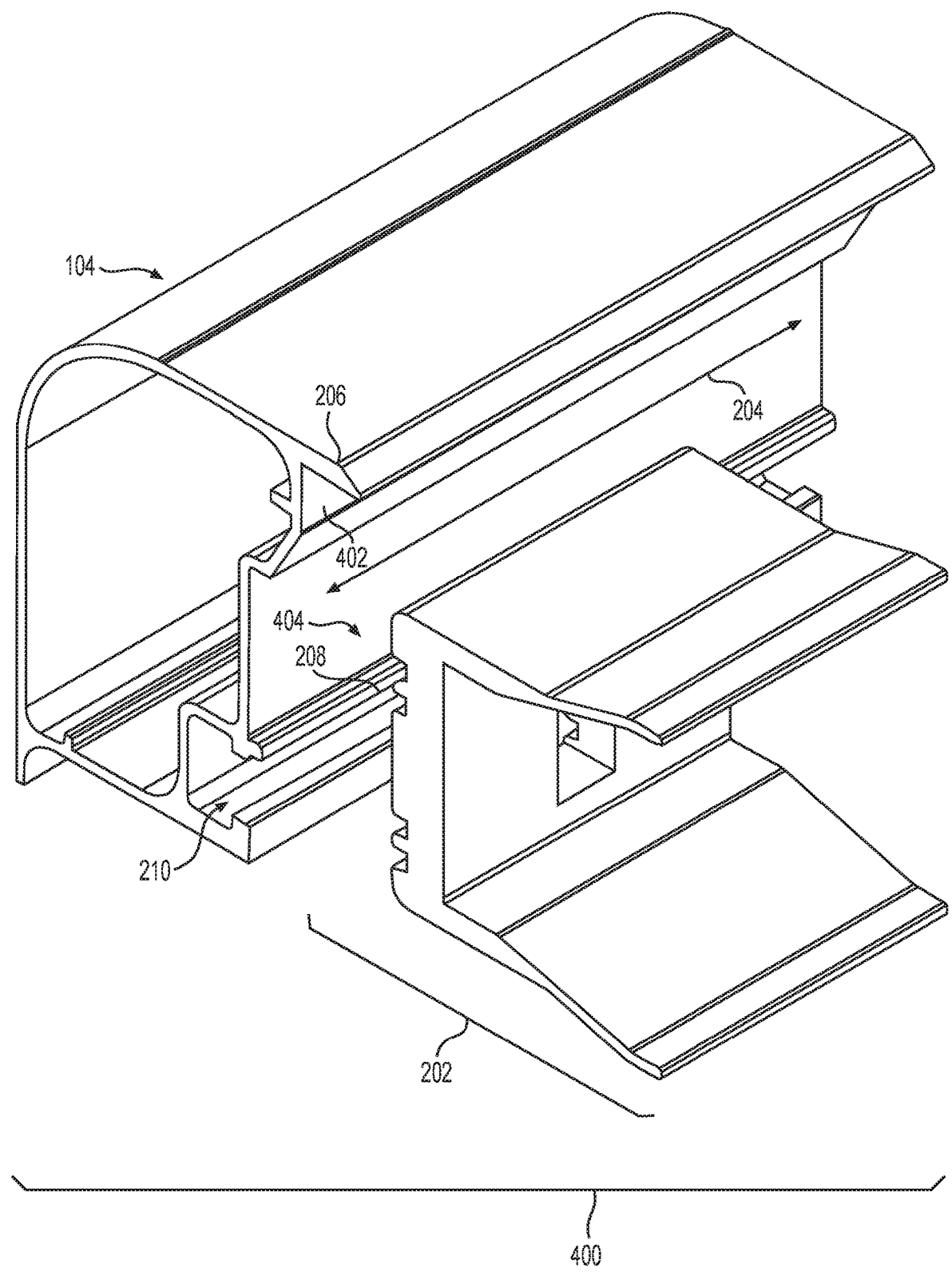
FIG. 4 illustrates another front perspective view of the clip attached to the rail of the solar panel mounting system of FIG. 1 according to an embodiment in this disclosure.

FIG. 4 illustrates another front perspective view 400 of the clip 202 attached to the rail 104 of the solar panel mounting system 102 of FIG. 1 according to an embodiment in this disclosure. FIG. 4 illustrates the horizontal flange 206 may protrude from an upper surface 402 of the rail 104 along the longitudinal length 204. The rib 208 may protrude from a lower surface 404 disposed a distance below the horizontal flange 206 and may extend along the longitudinal length 204. The channel 210 may extend along the longitudinal length 204 adjacent to the rib 208.

Figure 5:
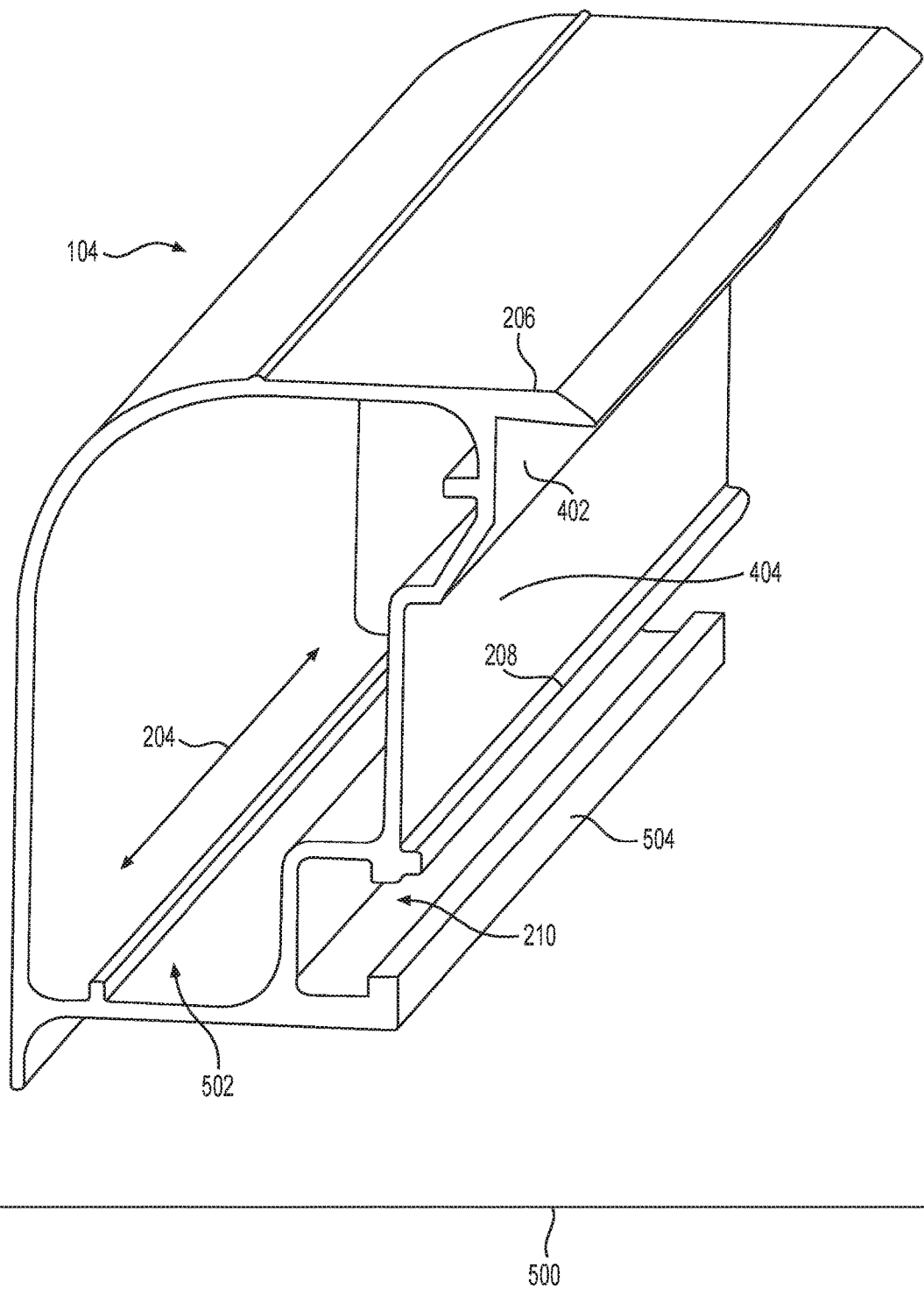
FIG. 5 illustrates a front perspective view of the rail of the solar panel mounting system of FIG. 1 according to an embodiment in this disclosure.

FIG. 5 illustrates a front perspective view 500 of the rail 104 of the solar panel mounting system 102 of FIG. 1, according to an embodiment in this disclosure. The rail 104 may include a cavity 502 disposed behind the upper surface 402, the horizontal flange 206, the rib 208, the lower surface 404, and the channel 210. Cavity 502 may extend along the longitudinal length 204. The cavity 502 may provide for receiving a splice bar (not shown) (discussed in detail below with regard to FIG. 8). The rail 104 may have a length of about 65 inches, a height of about 3 inches, and a width of about 2.5 inches. The rail 104 may include a surface 504 disposed below the rib 208 and extending the longitudinal length 204. When the clip 202 is attached to the rail 104 the clip 202 may interface with the surface 504 of the rail 104.

Figure 6:
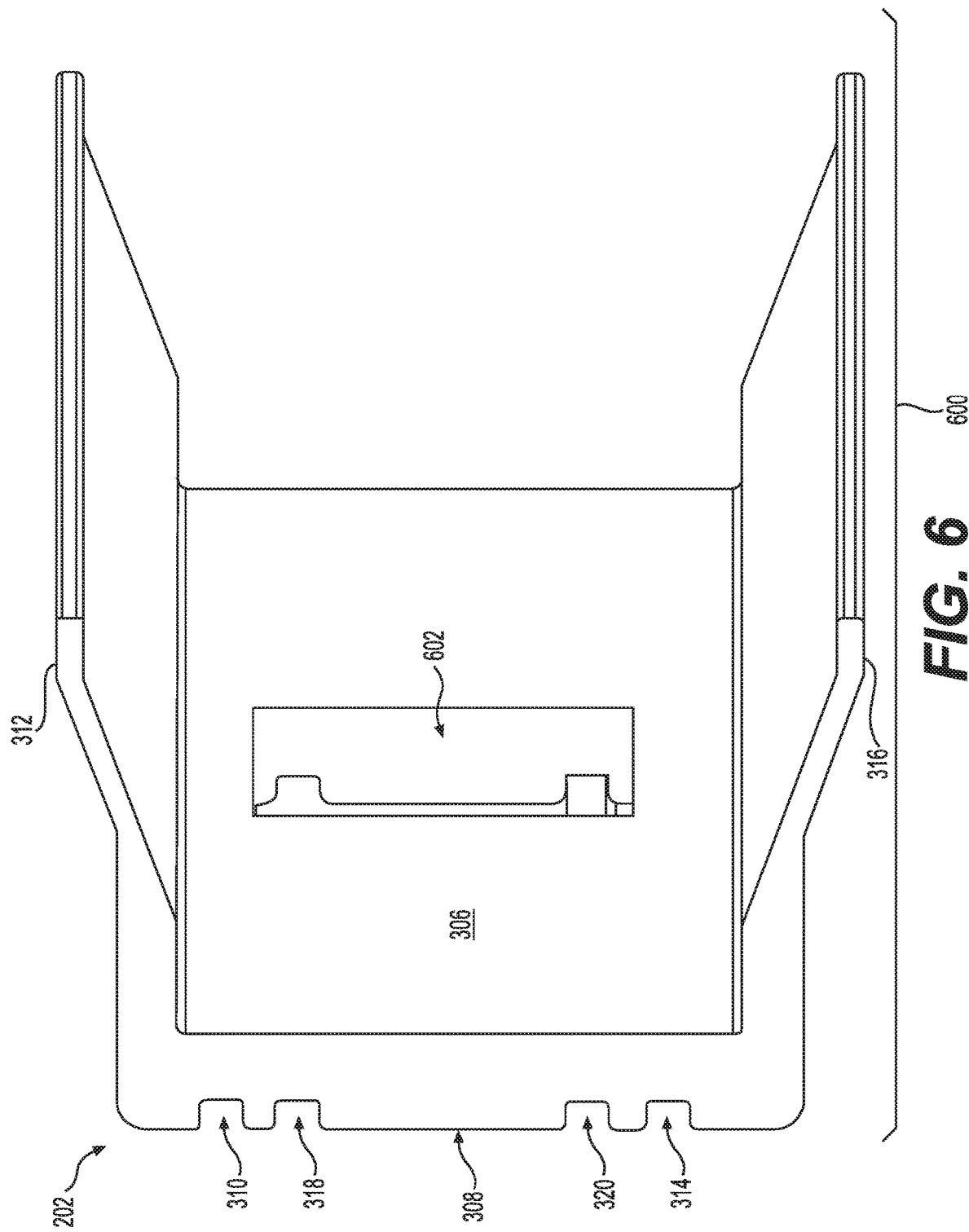
FIG. 6 illustrates a front perspective view of the clip according to an embodiment in this disclosure.

FIG. 6 illustrates a front perspective view 600 of the clip 202 according to an embodiment in this disclosure. An opening 602 may be arranged between the first ledge 312 and the second ledge 316 for receiving at least a portion of the fastener 322 (not shown here) to fasten the clip 202 to the rail 104. The opening 602 may pass through the front 306 of the clip 202 and the back 308 of the clip 202. The clip 202 may have a width of about 2 inches and a height of about 2 inches. The clip 202 may be made from an extrusion. For example, the clip 202 may be cut to length from an extended metal extrusion, a plastic extrusion, a composite extrusion, etc.

FIG. 6 illustrates the first ledge 312 and the second ledge 316 protruding from the front 306 of the clip 202 opposite the first notch 310, the second notch 314, the third notch 318, and the fourth notch 320 disposed in the back 308 of the clip 202.

Figure 7:
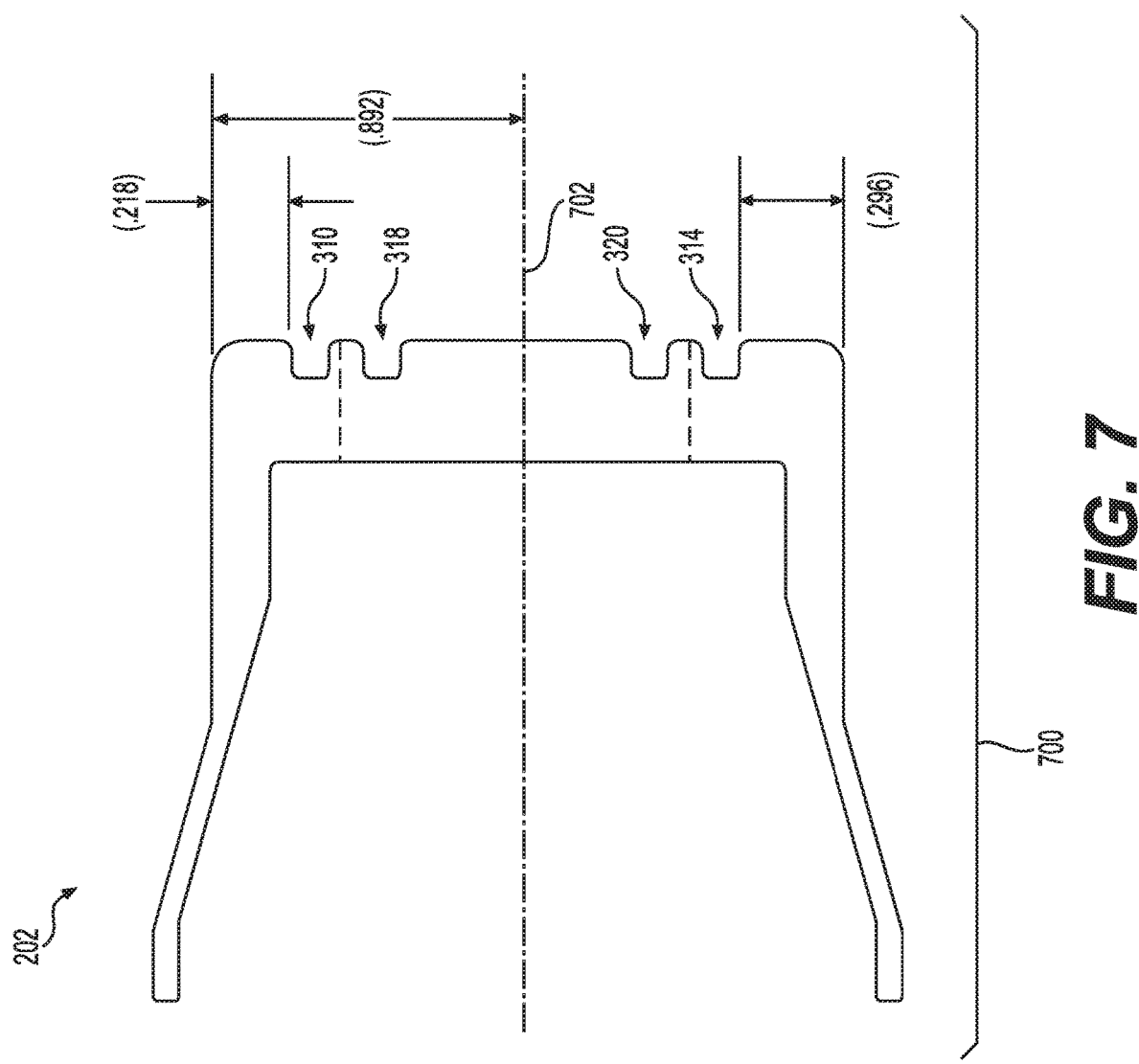
FIG. 7 illustrates a side view of the clip according to an embodiment in this disclosure.

FIG. 7 illustrates a side view 700 of the clip 202 according to an embodiment in this disclosure. The first notch 310 may be disposed in the back 308 of the clip 202 at about 0.6 inches from a center line 702 of the clip 202. The second notch 314 may be disposed in the back 308 of the clip 202 at about 0.5 inches from the center line 702 of the clip 202. The third notch 318 may be disposed in the back 308 of the clip 202 at about 0.4 inches from the center line 702 of the clip 202. The fourth notch 320 may be disposed in the back 308 of the clip 202 at about 0.3 inches from the center line 702 of the clip 202.

Figure 8:
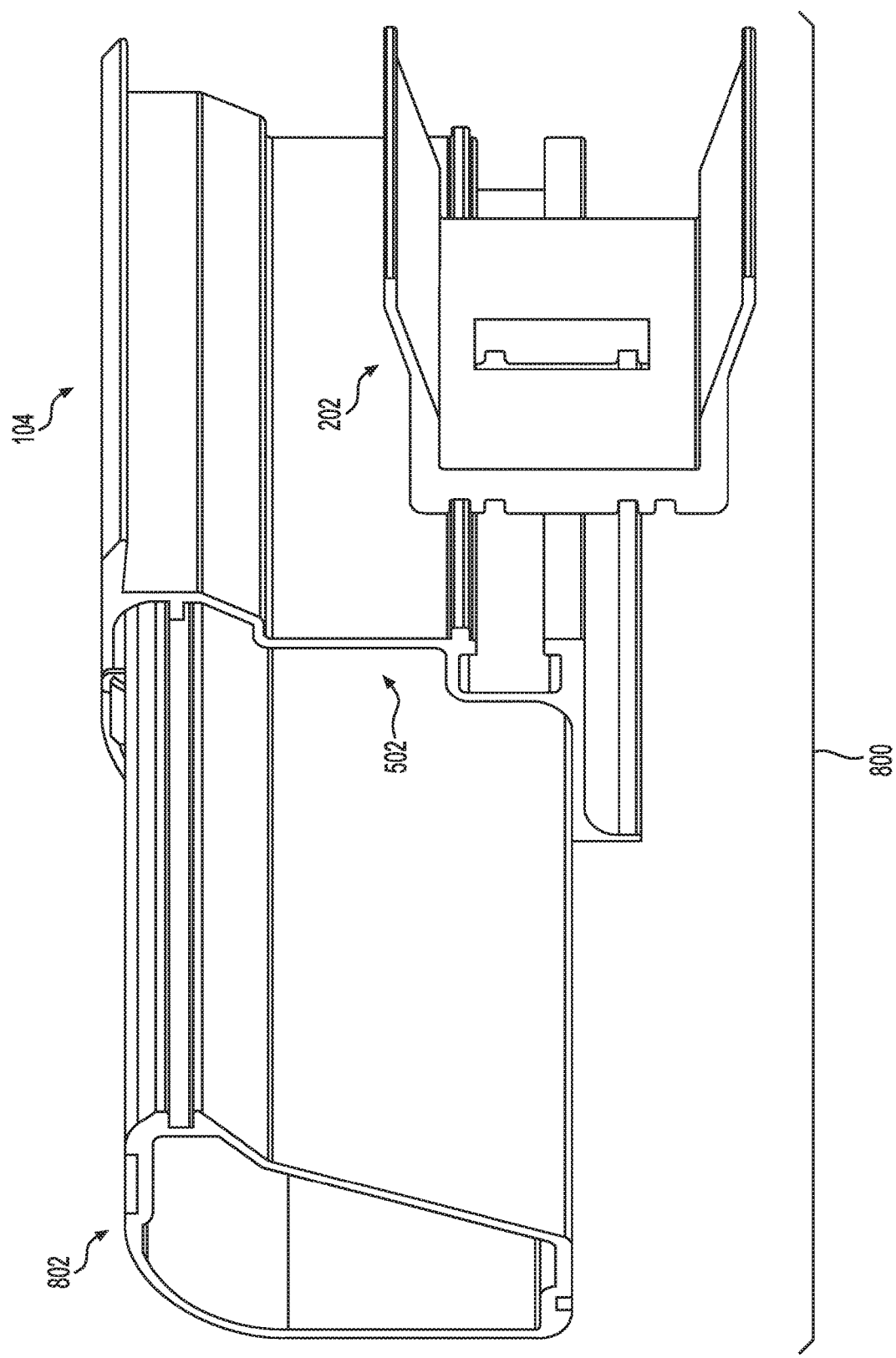
FIG. 8 illustrates another front perspective view of the clip attached to the rail of the solar panel mounting system of FIG. 1 including a splice bar installed in the rail according to an embodiment in this disclosure.

FIG. 8 illustrates another front perspective view 800 of the clip 202 attached to the rail 104 of the solar panel mounting system 102 of FIG. 1, including a splice bar 802 installed in the rail 104 according to an embodiment in this disclosure. The splice bar 802 may be an extrusion. For example, the splice bar 802 may be a metal extrusion, a plastic extrusion, a composite extrusion, etc. The cavity 502 of the rail 104 may receive the splice bar 802. For example, the cavity 502 of the rail 104 may slideably receive the splice bar 802. The splice bar 802 may provide for joining another rail section to the rail 104. A stop tab 804 may be fixed to the top surface of the splice bar 802 to provide for bonding the rail sections.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A solar panel mounting system comprising:
a rail having a longitudinal length, the rail for attaching to a bracket, the rail including:
a horizontal flange protruding from an upper surface of the rail along the longitudinal length, and
a rib protruding from a lower surface disposed a distance below the horizontal flange and extending along the longitudinal length; and
a clip having a first end separated a distance from a second end and a front opposite a back, the clip including:
a first notch disposed in the back of the clip proximate to the first end of the clip for receiving a portion of the rib,
a second notch disposed in the back of the clip proximate to the second end of the clip for receiving the portion of the rib,
a first ledge protruding from the front of the clip opposite the first notch, and
a second ledge protruding from the front of the clip opposite the second notch,
wherein:
when the first notch receives the portion of the rib, the first ledge is positioned a first distance from the horizontal flange such that the first distance is sized to receive an end of a first solar panel having a first thickness, and
when the second notch receives the portion of the rib, the second ledge is positioned a second distance, different than the first distance, from the horizontal flange such that the second distance is sized to receive an end of a second solar panel having a second thickness different than the first thickness of the first solar panel.

2. The solar panel mounting system of claim 1, wherein the first ledge is a spring ledge that reacts elastically up against the end of the first solar panel having the first thickness.

3. The solar panel mounting system of claim 1, wherein the second ledge is a spring ledge that reacts elastically up against the end of the second solar panel having the second thickness.

4. The solar panel mounting system of claim 1, wherein the first notch is disposed in the back of the clip at distance of about 0.6 inches from a center of the clip.

5. The solar panel mounting system of claim 1, wherein the second notch is disposed in the back of the clip at distance of about 0.5 inches from a center of the clip.

6. The solar panel mounting system of claim 1, further comprising a third notch proximate to the first end of the clip and below the first notch for receiving the portion of the rib, and wherein when the third notch receives the portion of the rib, the first ledge is positioned a third distance from the horizontal flange such that the third distance is sized to receive an end of a third solar panel having a third thickness different than the first thickness of the first solar panel and different than the second thickness of the second solar panel.

7. The solar panel mounting system of claim 6, further comprising a fourth notch proximate to the second end of the clip and above the second notch for receiving the portion of the rib, and wherein when the fourth notch receives the portion of the rib, the second ledge is positioned a fourth distance from the horizontal flange such that the fourth distance is sized to receive an end of a fourth solar panel having a fourth thickness different than the first thickness of the first solar panel, different than the second thickness of the second solar panel, and different than the third thickness of the third solar panel.

8. The solar panel mounting system of claim 1, further comprising a fastener fastening the clip to the rail, at least a portion of the fastener passing through an opening disposed in the clip and engaged with a channel extending along the longitudinal length of the rail adjacent to the rib of the rail.

9. A solar panel mounting system to mount a first solar panel having a first thickness to a rail or a second solar panel having a second thickness different than the first thickness to the rail, the solar panel mounting system comprising:
a clip having a first end separated a distance from a second end and a front opposite a back, the clip including:
a first notch disposed in the back of the clip proximate to the first end of the clip for receiving a portion of a rib of a rail,
a second notch disposed in the back of the clip proximate to the second end of the clip for receiving the portion of the rib of the rail,
a first ledge protruding from the front of the clip opposite the first notch, and
a second ledge protruding from the front of the clip opposite the second notch,
wherein;
when the first notch receives a portion of a rib of the rail, the first ledge is positioned a first distance from a horizontal flange of the rail such that the first distance is sized to receive an end of the first solar panel having the first thickness, and
when the second notch receives the portion of the rib, the second ledge is positioned a second distance, different than the first distance, from the horizontal flange of the rail such that the second distance is sized to receive an end of the second solar panel having the second thickness different than the first thickness of the first solar panel.

10. The solar panel mounting system of claim 9, further comprising a third notch proximate to the first end of the clip and below the first notch for receiving the portion of the rib, and wherein when the third notch receives the portion of the rib, the first ledge is positioned a third distance from the horizontal flange such that the third distance is sized to receive an end of a third solar panel having a third thickness different than the first thickness of the first solar panel and different than the second thickness of the second solar panel.

11. The solar panel mounting system of claim 10, further comprising a fourth notch proximate to the second end of the clip and above the second notch for receiving the portion of the rib, and wherein when the fourth notch receives the portion of the rib, the second ledge is positioned a fourth distance from the horizontal flange such that the fourth distance is sized to receive an end of a fourth solar panel having a fourth thickness different than the first thickness of the first solar panel, different than the second thickness of the second solar panel, and different than the third thickness of the third solar panel.

12. The solar panel mounting system of claim 9, wherein the first ledge is a spring ledge that reacts elastically up against the end of the first solar panel having the first thickness.

13. The solar panel mounting system of claim 9, wherein the second ledge is a spring ledge that reacts elastically up against the end of the second solar panel having the second thickness.

14. The solar panel mounting system of claim 9, wherein the first notch is disposed in the back of the clip at distance of about 0.6 inches from a center of the clip.

15. The solar panel mounting system of claim 9, wherein the second notch is disposed in the back of the clip at distance of about 0.5 inches from a center of the clip.

16. A solar panel mounting system to mount a first solar panel having a first thickness to a rail or a second solar panel having a second thickness different than the first thickness to the rail, the solar panel mounting system comprising:
a clip having a first end separated a distance from a second end and a front opposite a back, the clip including:
a first notch disposed in the back of the clip proximate to the first end of the clip for receiving a portion of a rib of the rail,
a second notch disposed in the back of the clip proximate to the second end of the clip for receiving the portion of the rib of the rail,
a first spring ledge protruding from the front of the clip opposite the first notch, and
a second spring ledge protruding from the front of the clip opposite the second notch,
wherein;
when the first notch receives a portion of a rib of the rail, the first spring ledge is positioned a first distance from a horizontal flange of the rail such that the first distance is sized to receive an end of the first solar panel having the first thickness and the first spring ledge reacts elastically up against the end of the first solar panel, and
when the second notch receives the portion of the rib, the second ledge is positioned a second distance, different than the first distance, from the horizontal flange of the rail such that the second distance is sized to receive an end of the second solar panel having the second thickness different than the first thickness of the first solar panel and the second spring ledge reacts elastically up against the end of the second solar panel.

17. The solar panel mounting system of claim 16, further comprising the rail, the rail having a longitudinal length and including a cavity disposed behind the rib of the rail or the horizontal flange of the rail, the cavity extending the longitudinal length.

18. The solar panel mounting system of claim 17, wherein the horizontal flange protrudes from an upper surface of the rail along the longitudinal length.

19. The solar panel mounting system of claim 17, wherein the rib protrudes from a lower surface disposed a distance below the horizontal flange and extending along the longitudinal length.

20. The solar panel mounting system of claim 17, the rail further including a channel extending along the longitudinal length of the rail adjacent to the rib of the rail, the channel for engaging with a fastener fastening the clip to the rail.

\* \* \* \* \*